(12) United States Patent
Chun

(10) Patent No.: US 9,229,736 B2
(45) Date of Patent: Jan. 5, 2016

(54) METHOD AND APPARATUS FOR CONTROLLING INTERRUPT IN PORTABLE TERMINAL

(75) Inventor: Eun-Jin Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 13/619,065

(22) Filed: Sep. 14, 2012

(65) Prior Publication Data

US 2013/0111091 A1 May 2, 2013

(30) Foreign Application Priority Data

Oct. 31, 2011 (KR) .................. 10-2011-0112211

(51) Int. Cl.
*G06F 13/24* (2006.01)
*G06F 9/44* (2006.01)
*H04M 1/725* (2006.01)
*H04M 19/04* (2006.01)

(52) U.S. Cl.
CPC .......... *G06F 9/4443* (2013.01); *H04M 1/72597* (2013.01); *H04M 19/048* (2013.01); *H04M 2250/22* (2013.01)

(58) Field of Classification Search
USPC ....................................................... 710/266
See application file for complete search history.

(56) References Cited

U.S. PATENT DOCUMENTS

| 6,868,283 | B1* | 3/2005 | Bonansea et al. ............. 455/566 |
|---|---|---|---|
| 7,289,772 | B1* | 10/2007 | Bonansea et al. ............... 455/73 |
| 8,072,492 | B2 | 12/2011 | Kondo et al. |
| 9,026,932 | B1 | 5/2015 | Dixon |
| 2008/0082936 | A1* | 4/2008 | Helvick ........................ 715/779 |
| 2008/0272907 | A1* | 11/2008 | Bonansea et al. ......... 340/539.11 |
| 2009/0249247 | A1 | 10/2009 | Tseng et al. |
| 2009/0264117 | A1* | 10/2009 | Hsieh et al. ................... 455/418 |
| 2011/0022311 | A1* | 1/2011 | Lee ............................... 701/208 |
| 2012/0047470 | A1 | 2/2012 | Martinoli |
| 2012/0124505 | A1 | 5/2012 | St. Jacques, Jr. |
| 2013/0024537 | A1 | 1/2013 | Takasugi et al. |

FOREIGN PATENT DOCUMENTS

| CN | 1930871 A | 3/2007 |
|---|---|---|
| JP | 2006-020286 | 1/2006 |
| JP | 2011-210051 | 10/2011 |
| JP | 2013-502818 | 1/2013 |
| WO | WO 01/77894 A1 | 10/2001 |

OTHER PUBLICATIONS

European Search Report dated Mar. 13, 2013 in connection with European Patent Application No. 12185008.5, 7 pages.

(Continued)

*Primary Examiner* — Nimesh G Patel

(57) ABSTRACT

A method and an apparatus for controlling an interrupt in a portable terminal are provided. The method includes executing an application based on user's control, determining whether an event occurs during the application execution, displaying information representing the event occurrence on a screen while continuing the application execution, and determining whether to interrupt the application by the event based on user's control.

42 Claims, 6 Drawing Sheets

(56) References Cited

OTHER PUBLICATIONS iPhoneHeat: "CallBar—Adds Notification Bar for Incoming Calls on iPhone", Internet citation, Jul. 19, 2011, URL: http://www.iphoneheat.com/2011/07/call bar-ads-notification-bar-for-incoming-calls-on-iphone/, 3 pages.

sonieso74: "Issue 16014: Unobtrusive incoming call notification", Internet citation, Apr. 7, 2011, URL: http://code.google.com/p.android/issues/edetail?id=16014, 1 page.

Notice of Preliminary Rejection dated Dec. 17, 2013 in connection with Japanese Patent Application No. 2012-237248, 4 pages.

Decision of Rejection dated Aug. 19, 2014 in connection with Japanese Patent Application No. 2012-237248; 5 pages.

Notification of Reconsideration Report dated Mar. 25, 2015 in connection with Japanese Patent Application No. 2012-237248; 5 pages.

First Office Action dated Aug. 17, 2015 in connection with Chinese Patent Application No. 2012-10417506.3; 13 pages.

Notice of Preliminary Rejection dated Oct. 27, 2015 in connection with Japanese Patent Application No. 2012-237248; 14 pages.

Non-Final Office Action dated Oct. 30, 2015 in connection with U.S. Appl. No. 13/232,431; 19 pages.

\* cited by examiner

METHOD AND APPARATUS FOR CONTROLLING INTERRUPT IN PORTABLE TERMINAL

CROSS-REFERENCE TO RELATED APPLICATION(S) AND CLAIM OF PRIORITY

The present application is related to and claims priority under 35 U.S.C. §119 to an application No. 10-2011-0112211 filed on Oct. 31, 2011 in the Korean Intellectual Property Office, the disclosure of which is incorporated herein in its entirety by reference.

TECHNICAL FIELD OF THE INVENTION

The present invention relates generally to a method and an apparatus for controlling an interrupt in a portable terminal.

BACKGROUND OF THE INVENTION

With a rapid increase in the number of users of portable terminals, service providers for the portable terminals provide various service functions in order to attract more users. Accordingly, in addition to a general call function, recent portable terminals have various applications (hereinafter also referred to as an app or apps), such as electronic scheduler, Internet search, digital multimedia broadcast reception, streaming service, video play, and game.

However, using the portable terminals as an advertisement means is increasing due to the increase in the use of portable terminals. Accordingly, the number of cases where advertisement calls or messages are received in portable terminals is rapidly increasing. However, although most of the advertisement calls or messages are not desired by users, the portable terminals execute relevant apps to inform the users of the call/message reception whenever receiving the advertisement calls or messages. This causes an inconvenience to the users.

For example, when receiving an advertisement call or message during the execution of a video player app according to user's control, the portable terminal interrupts the execution of the video player app and executes an app corresponding to the advertisement call or message to provide information on the advertisement call or message to the user. Accordingly, the user is inconvenienced by the interruption of the apps due to the undesired advertisement calls or messages.

SUMMARY OF THE INVENTION

To address the above-discussed deficiencies of the prior art, it is a primary object to provide a method and an apparatus for minimizing the occurrence of an interrupt during the execution of an application in a portable terminal.

Another object of the present disclosure is to provide a method and an apparatus for providing, when an event occurs during the execution of an application in a portable terminal, information on the event occurrence to a user while continuing the application execution state.

Another object of the present disclosure is to provide a method and an apparatus for allowing, when an event occurs during the execution of an application in a portable terminal, a user to select whether to interrupt the application.

According to an aspect of the present disclosure, a method for controlling an interrupt in a portable terminal includes executing an application according to user's control, determining whether an event occurs during the application execution, displaying information representing the event occurrence on a screen while continuing the application execution and determining whether to interrupt the application by the event based on user's control.

According to another aspect of the present disclosure, an apparatus for controlling an interrupt in a portable terminal includes a control unit for executing an application based on user's control, determining whether an event occurs during the application execution, controlling a function for displaying information representing the event occurrence while continuing the application execution, and determining whether to interrupt the application by the event based on user's control, a display unit for displaying images and information under the control of the control unit; and an input unit for receiving control information from the user.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Exemplary embodiments of the present invention will be described herein below with reference to the accompanying drawings. In the following description, detailed descriptions of well-known functions or configurations will be omitted since they would unnecessarily obscure the subject matters of the present invention. Also, the terms used herein are defined according to the functions of the present invention. Thus, the terms may vary depending on users' or operators' intentions or practices. Therefore, the terms used herein should be understood based on the descriptions made herein.

Hereinafter, a description will be given of a method and apparatus for minimizing the occurrence of an interrupt during the execution of an application in a portable terminal according to the present disclosure. Examples of a portable terminal described herein may include a mobile terminal, a personal digital assistant (PDA), a laptop computer, a smart phone, a netbook, a mobile Internet device (MID), an ultra mobile personal computer (UMPC), a tablet PC, a navigation device, and an MPEG Audio Layer-3 (MP3) player. Also, an interrupt described herein may refer to interrupting an app due to the occurrence of an event during the execution of the app and processing the event. Also, an app described herein may refer to any application program that can be installed and operated in a portable terminal, such as electronic scheduler, Internet search, digital multimedia broadcast reception, streaming service, music play, video play, and game.

The present disclosure relates to a method and an apparatus for minimizing interruptions during the execution of an application in a portable terminal.

Figure 1:
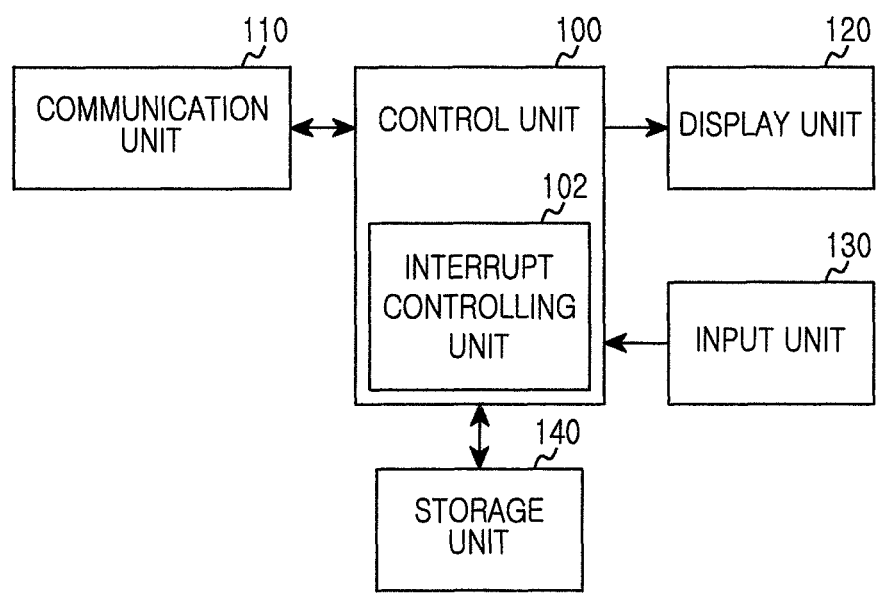
FIG. 1 illustrates a high level structural block diagram of a portable terminal according to embodiments of the present disclosure.

FIG. 1 illustrates a high level structural block diagram of a portable terminal according to one embodiment of the present disclosure. The portable terminal includes a control unit 100, a communication unit 110, a display unit 120, an input unit 130, and a storage unit 140. The control unit 110 also includes an interrupt controlling unit 102.

The control unit 100 controls and processes an overall operation of the portable terminal, and controls and processes a function for executing an app supported by the portable terminal, according to user's control. In particular, according to the present disclosure, with the interrupt controlling unit 102, the control unit 100 controls and processes functions for displaying, when an event occurs during the execution of an app, information related to the event occurrence on a screen and controlling whether to interrupt the app based on user's control. The event can include call reception, message reception, and alarm generation. The event may refer to any event that may affect an app execution operation, because it is necessary to provide event-related information to the user through video signal or audio signal.

That is, the interrupt controlling unit 102 detects the occurrence of an event during the execution of an app. When an event occurs during the execution of an app, the interrupt controlling unit 102 controls and processes functions for displaying information representing the event occurrence on the display unit 120. Herein, the interrupt controlling unit 102 causes the app execution to be continued, while displaying the information representing the event occurrence on the screen. In certain embodiments, when detecting the reception of a call from a caller A while playing a video, the interrupt controlling unit 102 displays information indicating the reception of the call from caller A in a specified portion of the screen while continuing to play the video. In certain embodiments, the specified portion of the screen, in which the information representing the event occurrence is displayed, may be a top, bottom, left or right portion of the screen in order not to disturb the app execution.

Also, the interrupt controlling unit 102 detects a user's input through the input unit 130 and determines whether to interrupt the app by the event. That is, the interrupt controlling unit 102 controls and processes functions for comparing a user input with specified input modes. According to the comparison result, the interrupt controlling unit 102 will either interrupt the current app and execute another app which is related to the event, or display additional information related to the event while continuing the app execution, or disregard the event occurrence and continuing the app execution. In certain embodiments, when information representing the reception of a text message from a caller while playing a video is displayed in a specified portion and then the user touches and holds the information displayed in the specified portion of the screen for a specified time or more, the interrupt controlling unit 102 controls a function for interrupting the video play, executes a message managing app, and switches the screen for displaying the received message. Alternatively, when the user touches and left-drags the information displayed in the specified portion, the interrupt controlling unit 102 can display additional information related to the received message, that is, the content of the received message. Also, when the user touches and right-drags the information displayed in the specified portion of the screen, the interrupt controlling unit 102 can disregard the message reception and continue to play the video.

The communication unit 110 communicates with another node under the control of the control unit 100. The communication unit 110 controls and processes a function for converting radio frequency (RF) signal received through an antenna into baseband signal and providing the baseband signal to the control unit 100, and converting a baseband signal received from the control unit 100 into RF signal and transmitting the RF signal to another node through the antenna.

The display unit 120 displays a variety of status information, numerals, characters, and images that are generated during an operation of the portable terminal. In particular, the display unit 120 may display video signals on a screen with the execution of an app in the portable terminal and may display event-related information in a specified portion of the screen when an event occurs.

The input unit 130 can include one or more function keys or touch sensors. The input unit 130 provides the control unit 100 with data corresponding to a key pressed by the user or data corresponding to a position touched by the user. In certain embodiments, according to the present disclosure, when an event occurs during the execution of an app, the input unit 130 receives data for determining whether to interrupt the app from the user and provides the data to the control unit 100.

The storage unit 140 stores a variety of program and status information necessary during an operation of the portable terminal. In certain embodiments, the storage unit 140 stores various apps that are executable in the portable terminal. Also, when an event occurs in relation to an app that is being executed, the storage unit 140 stores information on a function that is to be performed based on user input. In certain embodiments, when a user drags in the left direction, the storage unit 140 stores information indicating the performance of a function for displaying additional information related to the event while maintaining the app execution state. When a user drags in the right direction, the storage unit 140 stores information indicating the performance of a function for disregarding the event while continuing the app execution state. When a user continues to touch at the same point for a specified time or more, the storage unit 140 stores information indicating the performance of a function for interrupting the app execution, executing an app corresponding to the event and switching the screen. In addition to the above input modes, the input mode can include a double touch, a curved touch, and a vertically-dragged touch.

The method described above in relation with FIG. 1 under of the present invention may be provided as one or more instructions in one or more software modules stored in the respective portable terminals.

Figure 2:
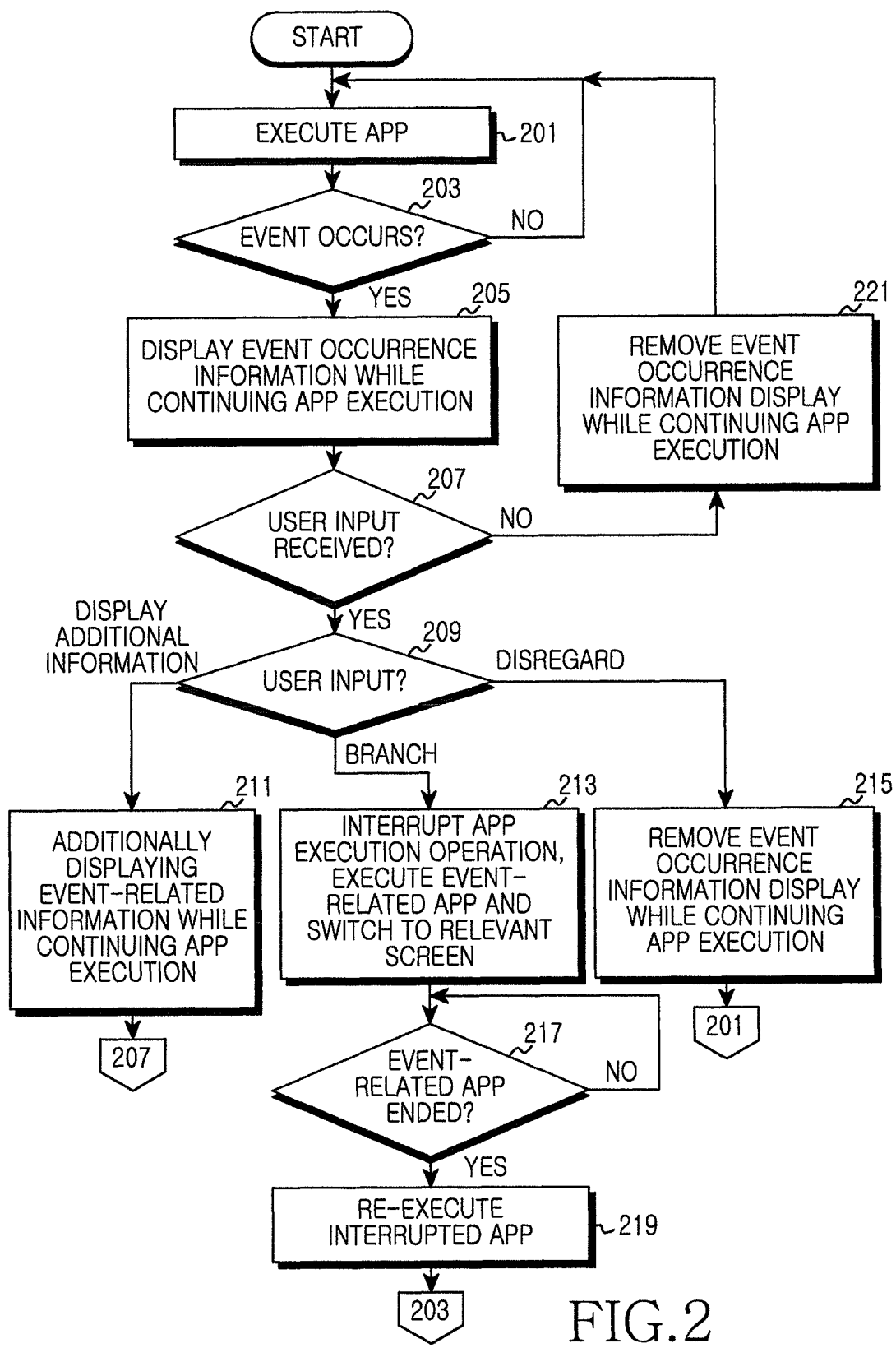
FIG. 2 depicts a flowchart illustrating an operation process of a portable terminal according to embodiments of the present disclosure.

FIG. 2 depicts a flowchart illustrating an operation process of a portable terminal according to one embodiment of the present disclosure.

In step 201, the portable terminal executes an app based on user's control. In certain embodiments, the portable terminal executes a video player app based on user's control.

In step 203, the portable terminal determines whether an event occurs during the app execution. When an event does not occur during the app execution, the portable terminal returns to step 201 and maintains the app execution state.

Alternatively, when an event occurs during the app execution, the portable terminal proceeds to step 205. In step 205, the portable terminal displays information representing the event occurrence on a screen while continuing the app execution operation. In certain embodiments, when detecting message reception while playing a video, the portable terminal displays information indicating the reception of a message from another user on the screen while continuing to play the video. Herein, in order not to interrupt the app execution, the portable terminal may display the information representing the event occurrence in a specified portion of the screen. In certain embodiments, when the app plays a video containing a caption, the portable terminal can display the information representing the event occurrence on a screen portion that does not overlap with a caption area.

In step 207, the portable terminal determines whether user input has been received. When user input has not been received for a specified time, the portable terminal proceeds to step 221. In step 221, the portable terminal removes the displayed information while continuing the app execution operation. Thereafter, the portable terminal returns to step 201. That is, when the portable terminal informs the user of the event occurrence during the app execution but a user input has not received for a specified time, the portable terminal continues the app execution in step 201 without executing an app related to the event, by determining that the user desires to disregard the event.

Alternatively, when a user input has received, the portable terminal proceeds to step 209. In step 209, the portable terminal compares the user input with the specified inputs and determines which function is to be performed.

When it is determined in step 209 that the user input a command corresponding to Display Additional Information among specified input modes, the portable terminal proceeds to step 211. In step 211, the portable terminal detects additional information related to the event and displays the additional information in a specified portion of the screen while maintaining the app execution. The additional information related to the event is detailed information of the event. In certain embodiments, when the event is message reception, the additional information can be the content of a received message. If the event is alarm generation, the additional information can be a detailed schedule corresponding to a generated alarm. Thereafter, the portable terminal returns to step 207. Herein, the input command corresponding to Display Additional Information can be a touch and drag from right to left. In this embodiment, the portable terminal may gradually move the displayed additional information from the right to the left of the screen in accordance with a drag operation of the user, thereby providing the effect that the additional information flows from the right to the left of the screen.

In another embodiment, when it is determined in step 209 that the user has input a command corresponding to Branch among the specified input commands, the portable terminal proceeds to step 213. In step 213, the portable terminal interrupts the app execution, executes an event-related app and switches the screen for the event related app. Herein, the input command corresponding to Branch can be a touch performed on the screen for a specified time or more. In certain embodiments, in the state where a message has been received during video play and information indicating the message reception is displayed on the screen, when the user touches a display portion of the information for a specified time or more, the portable terminal interrupts the video play, executes a message managing app and switches to a screen for displaying, a received message.

In step 217, the portable terminal determines whether the event-related app has ended. When the event-related app ends, the portable terminal proceeds to step 219. In step 219, the portable terminal re-executes the interrupted app. Thereafter, the portable terminal returns to step 203.

In another embodiment, when it is determined in step 209 that the user has input a command corresponding to Disregard among the specified input commands, the portable terminal proceeds to step 215. In step 215, the portable terminal removes the information displayed on the screen in step 205 while continuing to execute the app. Thereafter, the portable terminal returns to step 201. Herein, the command corresponding to Disregard can be a touch dragged from left to right. In this embodiment, the portable terminal can gradually move the displayed information from the left to the right of the screen in accordance with a drag operation of the user, thereby providing the effect that the displayed information gradually disappears to the right of the screen.

As described above, when an event occurs during the execution of an app, the present invention provides information on the event to the user while maintaining the app execution state, thus allowing the user to select whether to interrupt the app and then branch (or switch) to another app which is related to the event, or to disregard the event occurrence and maintaining the app execution.

Thereafter, in order to assist in understanding the above description, an embodiment where a call reception event or a message reception event occurs during video play will be described with reference to FIGS. 3A to 4B. Although a portable terminal is illustrated as being in a horizontal mode, the present disclosure can be applicable regardless of whether the portable terminal is in a horizontal mode or in a vertical mode.

Figure 3A:
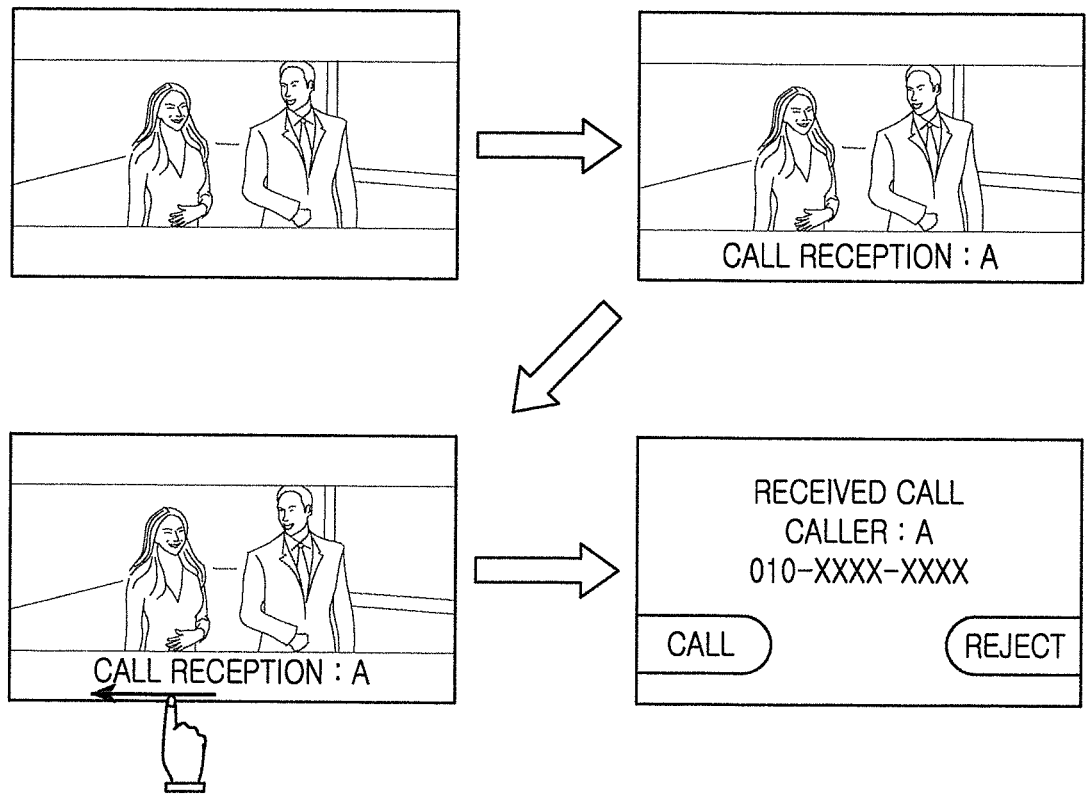
FIGS. 3A and 3B illustrate screen configurations for showing a method for handling an interrupt based on user's control when a call is received during the execution of an application in a portable terminal according to embodiments of the present disclosure.
Figure 3B:
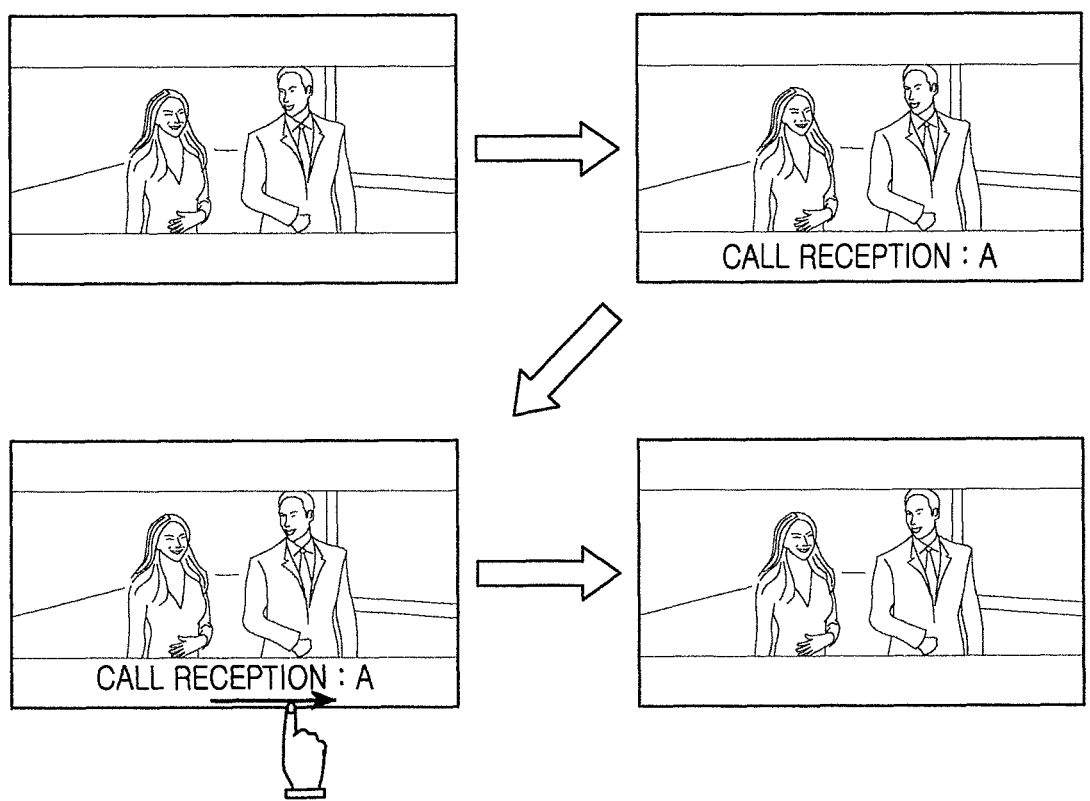

FIGS. 3A and 3B illustrate a screen configuration for controlling an interrupt by user's control when a call is received during the execution of an application in a portable terminal according to one embodiment of the present disclosure.

The portable terminal plays a movie by executing a video player app by user's control. When receiving a call from a caller while playing the movie, the portable terminal displays information indicating the reception of a call from the caller in a bottom portion of a screen while continuing to play the movie. In this case, when a user of the portable terminal touches and drags a relevant screen portion from right to left, the portable terminal interrupts the video player app to interrupt the movie play and executes a call-related app to display a screen for connecting or rejecting a call. Although not illustrated in the drawings, when the user rejects a call or a call connection is ended, the portable terminal may re-execute the interrupted video player app to re-play the movie.

The portable terminal plays a movie by executing a video player app based on user's control. When receiving a call from a caller while playing the movie, the portable terminal displays information indicating the reception of the call from the caller in a bottom portion of a screen while continuing. to play the movie. In this case, when a user of the portable terminal touches and drags a relevant screen portion from left to right, the portable terminal removes call reception information displayed on the screen and continues to play the movie.

Figure 4A:
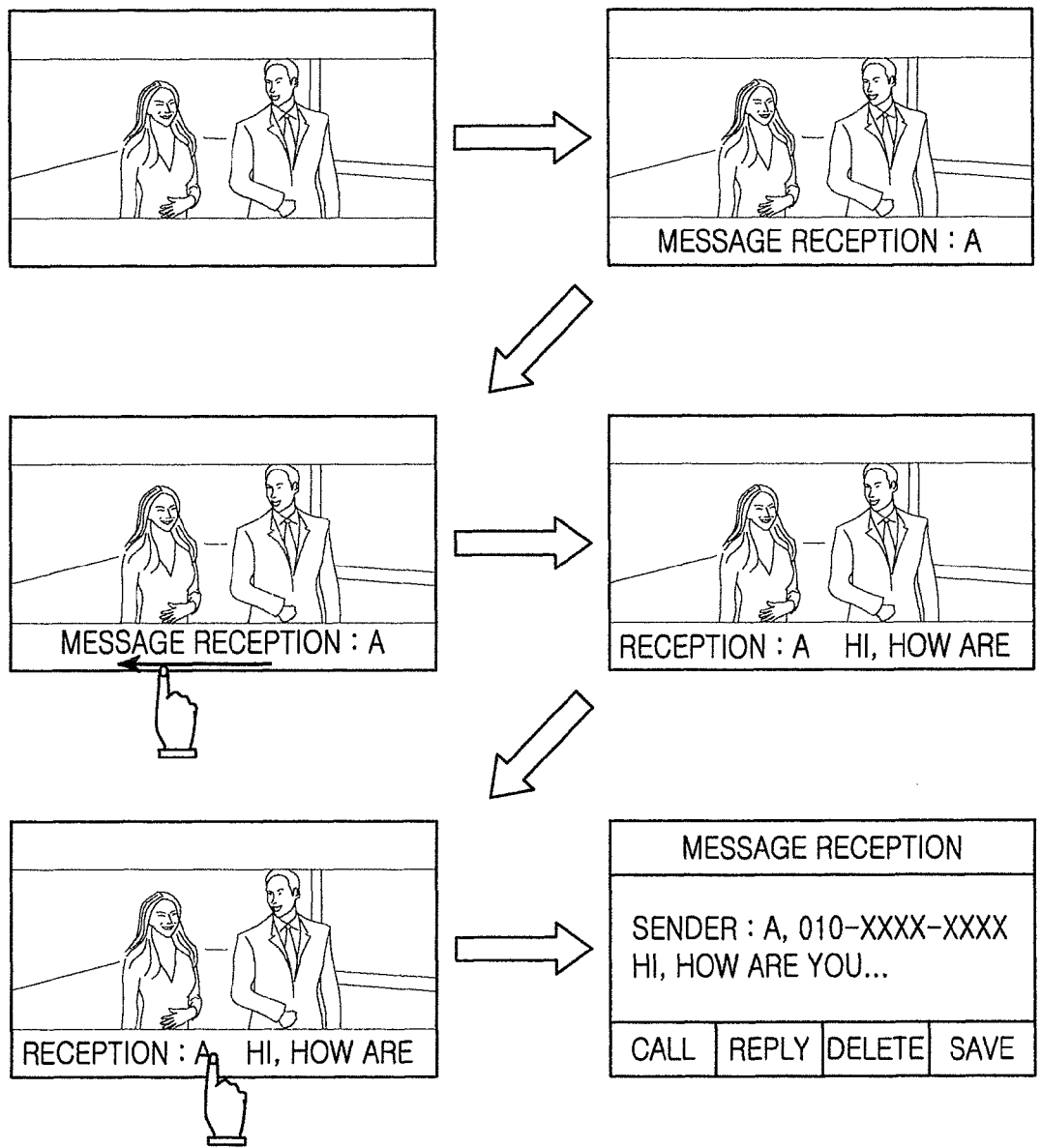
FIGS. 4A and 4B illustrate screens showing a method for handling an interrupt based on user's control when a message is received during the execution of an application in a portable terminal according to embodiments of the present disclosure.
Figure 4B:
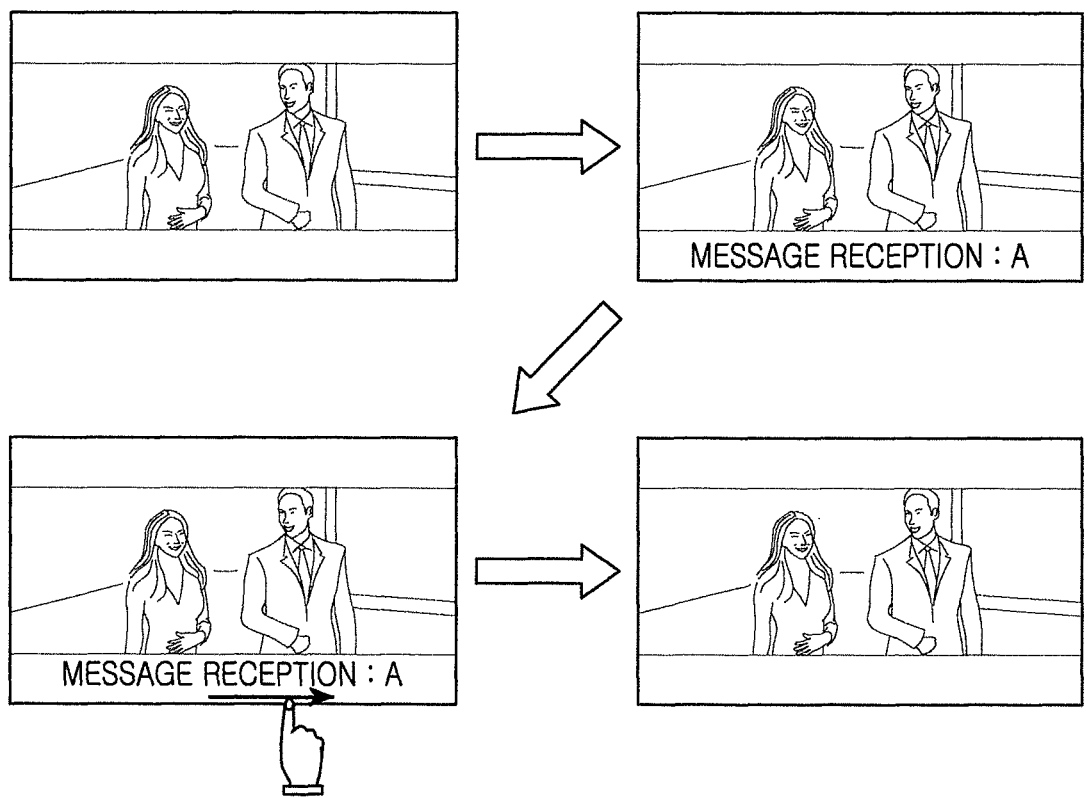

FIGS. 4A and 4B illustrate a screen configuration for controlling an interrupt by user's control when a message is received during the execution of an application in a portable terminal according. to one embodiment of the present disclosure.

The portable terminal plays a movie with a video player app by user's control. When receiving a message from the caller while playing the movie, the portable terminal displays information indicating the reception of the message from the user A in a bottom portion of a screen, while continuing playing the movie. In this embodiment, when a user of the portable terminal touches and drags a relevant part of the screen portion from right to left, the portable terminal additionally displays the content of the received message in the bottom portion of the screen while continuing to play the movie. Thereafter, when the user touches a relevant screen portion for a specified time or more, the portable terminal interrupts the video player app to pause the movie, and executes a message-related app to display on the screen an indication for checking the received message and performing a message-related function. Although not illustrated in the drawings, when the user ends the message-related app after checking the received message or after performing the message-related function, the portable terminal may re-execute the interrupted video player app to re-play the interrupted movie.

The portable terminal plays a movie by executing a video player app by user's control. When receiving a message from a caller while playing the movie, the portable terminal displays information indicating the reception of the message from the caller in a bottom portion of a screen, while continuing, to play the movie. In this embodiment, when a user of the portable terminal touches and drags a relevant screen portion from left to right, the portable terminal removes message reception information displayed on the screen and continues to play the movie.

As described above, in order to control an interrupt, a portable terminal according to one embodiment of the present disclosure performs an operation of executing an application by user's control, an operation of determining whether an event occurs during the application execution, an operation of displaying information representing the event occurrence on a screen while maintaining the application execution, and an operation of determining whether to interrupt the application by the event with the user's control.

Also, in order to control an interrupt, a portable terminal according to one embodiment of the present disclosure includes a control unit for executing an application by user's control, determining whether an event occurs during the application execution, controlling a function for displaying information representing the event occurrence while continuing to execute the application, and determining whether to interrupt the application by the event based on user's control, a display unit for displaying images and information under the control of the control unit and an input unit for receiving control information from the user.

It has been described that when an event occurs during app execution, an interrupt is controlled with respect to all apps supported by the portable terminal. However, the above function of the present invention can be performed only with respect to an app that uses the entire screen of the portable terminal.

The methods according to the embodiments described in the claims and/or specification of the present invention can be implemented by hardware, software, or a combination thereof.

When the methods are implemented by software, a computer-readable storage medium can be provided to store one or more programs (software modules). The one or more programs stored in the computer-readable storage medium can be configured for execution by one or more processors in an electronic device. The one or more programs can include instructions for causing the electronic device to execute the methods according to the embodiments described in the claims and/or specification of the present disclosure.

These programs (software modules or software) can be stored in random access memories (RAMs), nonvolatile memories including flash memories, read only memories (ROMs), electrically erasable programmable ROMs (EEPROMs), magnetic disc storage devices, compact discROMs (CD-ROMs), digital versatile discs (DVDs), other types of optical storage devices, or magnetic cassettes. Also, the programs can be stored in a memory configured by a combination of some or all of such storage devices. Also, each of the memories can be provided in plurality.

Also, the programs may be stored in an attachable storage device that can be accessed by the electronic device through a communication network such as Internet, Intranet, local area network (LAN), wireless LAN (WLAN), or storage area network (SAN), or through a communication network configured by a combination thereof. This storage device can access the electronic device through an external port.

Also, a separate storage device on a communication network can access a portable electronic device.

As described above, when an event occurs during the execution of an application in a portable terminal, the present invention allows a user to select whether to interrupt the application, by providing information on the event occurrence to the user while maintaining the application execution state. Accordingly, the present disclosure can prevent the application from being interrupted by an event that is not desired by the user.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A portable terminal comprising:
a touch screen; and
a control unit configured to:
   detect a reception of an incoming message event during an execution of a first application,
   control the touch screen to display a notification window for depicting at least a portion of an entire message associated with the incoming message event while displaying at least a portion of an application screen associated with the execution of the first application, wherein the notification window is displayed on an area of the touch screen that is less than an entire area of the touch screen, in response to detecting a touch input on the notification window to execute a message application, control the touch screen to display an application screen associated with the message application, and in response to detecting a drag input on the notification window when the window depicts only the portion of the entire message associated with the incoming message event, control the touch screen to display another portion of the entire message on the notification window while displaying at least the portion of the application screen associated with the execution of the first application.

2. The portable terminal of claim 1, wherein the first application is a video application.

3. The portable terminal of claim 2, wherein in response to detecting an input to remove the notification window, the control unit is configured to control the touch screen to display the application screen associated with the execution of the first application after removing the notification window.

4. The portable terminal of claim 3, wherein in response to detecting a touch input on the notification window after displaying the other portion of the entire message based on the drag input, the control unit is configured to control the touch screen to display the application screen associated with the message application.

5. The portable terminal of claim 4, wherein the drag input comprises a drag input across at least a portion of the notification window in a predetermined direction.

6. The portable terminal of claim 5, wherein the control unit is configured to continue the execution of the first application while controlling the touch screen to display the notification window.

7. The portable terminal of claim 1, wherein the message application comprises an application receiving a social network service (SNS) text message.

8. The portable terminal of claim 1, wherein in response to detecting an input to remove the notification window, the control unit is configured to control the touch screen to display the application screen associated with the execution of the first application after removing the notification window.

9. The portable terminal of claim 1, wherein in response to detecting a touch input on the notification window after displaying the other portion of the entire message based on the drag input, the control unit is configured to control the touch screen to display the application screen associated with the message application.

10. The portable terminal of claim 1, wherein the portable terminal is a mobile communication terminal configured to receive a call and permit voice communication through the call.

11. The portable terminal of claim 1, wherein the drag input comprises a drag input across at least a portion of the notification window in a predetermined direction.

12. The portable terminal of claim 1, wherein the control unit is configured to pause the execution of the first application while controlling the touch screen to display the application screen associated with the message application.

13. The portable terminal of claim 1, wherein the control unit is configured to continue the execution of the first application while controlling the touch screen to display the notification window.

14. The portable terminal of claim 1, wherein the application screen associated with the message application occupies an entire display area of the touch screen.

15. The portable terminal of claim 1, wherein the portion of the entire message comprises information relating to a user of the incoming message.

16. A method implemented using a portable terminal, the method comprising:

detecting a reception of an incoming message event during an execution of a first application;

controlling a touch screen to display a notification window for depicting at least a portion of an entire message associated with the incoming message event while displaying at least a portion of an application screen associated with the execution of the first application, wherein the notification window is displayed on an area of the touch screen that is less than an entire area of the touch screen;

in response to detecting a touch input on the notification window to execute a message application, controlling the touch screen to display an application screen associated with the message application; and in response to detecting a drag input on the notification window when the window depicts only the portion of the entire message associated with the incoming message event, controlling the touch screen to display another portion of the entire message on the notification window while displaying at least the portion of the application screen associated with the execution of the first application.

17. The method of claim 16, wherein the first application is a video application.

18. The method of claim 16, wherein the message application comprises an application receiving a social network service (SNS) text message.

19. The method of claim 16, wherein in response to detecting an input to remove the notification window, controlling the touch screen to display the application screen associated with the execution of the first application after removing the notification window.

20. The method of claim 16, wherein in response to detecting a touch input on the notification window after displaying the other portion of the entire message based on the drag input, controlling the touch screen to display the application screen associated with the message application.

21. The method of claim 16, further comprising when the portable terminal is a mobile communication terminal, receiving a call and permitting voice communication through the call.

22. The method of claim 16, wherein the drag input comprises a drag input across at least a portion of the notification window in a predetermined direction.

23. The method of claim 16, further comprising pausing the execution of the first application while controlling the touch screen to display the application screen associated with the message application.

24. The method of claim 16, further comprising continuing the execution of the first application while controlling the touch screen to display the notification window.

25. The method of claim 16, wherein the application screen associated with the message application occupies an entire display area of the touch screen.

26. The method of claim 16, wherein the portion of the entire message comprises information relating to a user of the incoming message.

27. A mobile communication terminal capable of performing voice communication via a cellular communication, the mobile communication terminal comprising:
- a touch screen; and
- a control unit configured to:
  - detect a reception of an incoming message from another mobile communication terminal via the cellular communication during an execution of a first application,
  - control the touch screen to display a notification window associated with the incoming message in response to detecting the reception of the incoming message while displaying at least a portion of an application screen associated with the execution of the first application,
  - in response to detecting a touch input on the notification window to execute a message application, control the touch screen to display an application screen associated with the message application, and
  - in response to detecting a scroll input on the notification window, control the touch screen to display another portion of the incoming message on the notification window while displaying at least the portion of the application screen associated with the execution of the first application.

28. The mobile communication terminal of claim 27, wherein the first application is a video application.

29. The mobile communication terminal of claim 28, wherein in response to detecting an input to remove notification window, controlling the touch screen to display the application screen associated with the execution of the first application after removing the notification window.

30. The mobile communication terminal of claim 29, wherein in response to detecting a touch input on the notification window after displaying the other portion of the incoming message based on the scroll input, controlling the touch screen to display the application screen associated with the message application.

31. The mobile communication terminal of claim 30, wherein the scroll input comprises a scroll input across at least a portion of the notification window in a predetermined direction.

32. The mobile communication terminal of claim 31, further comprising continuing the execution of the first application while controlling the touch screen to display the notification window.

33. The mobile communication terminal of claim 27, wherein in response to detecting an input to remove notification window, controlling the touch screen to display the application screen associated with the execution of the first application after removing the notification window.

34. The mobile communication terminal of claim 27, wherein in response to detecting a touch input on the notification window after displaying the other portion of the incoming message based on the scroll input, controlling the touch screen to display the application screen associated with the message application.

35. The mobile communication terminal of claim 27, wherein the scroll input comprises a scroll input across at least a portion of the notification window in a predetermined direction.

36. The mobile communication terminal of claim 27, further comprising continuing the execution of the first application while controlling the touch screen to display the notification window.

37. A method implemented using a mobile communication terminal configured to perform voice communication via a cellular communication system, the method comprising:
- detecting a reception of an incoming message from another mobile communication terminal via the cellular communication system during an execution of a first application;
- controlling the touch screen to display a notification window associated with the incoming message in response to detecting the reception of the incoming message while displaying at least a portion of an application screen associated with the execution of the first application;
- in response to detecting a touch input on the notification window to execute a message application, controlling the touch screen to display an application screen associated with the message application; and
- in response to detecting a scroll input on the notification window, controlling the touch screen to display another portion of the incoming message on the notification window while displaying at least the portion of the application screen associated with the execution of the first application.

38. The method of claim 37, wherein the first application is a video application.

39. The method of claim 37, wherein in response to detecting an input to remove notification window, controlling the touch screen to display the application screen associated with the execution of the first application after removing the notification window.

40. The method of claim 37, wherein in response to detecting a touch input on the notification window after displaying the other portion of the incoming message based on the scroll input, controlling the touch screen to display the application screen associated with the message application.

41. The method of claim 37, wherein the scroll input comprises a scroll input across at least a portion of the notification window in a predetermined direction.

42. The method of claim 37, further comprising continuing the execution of the first application while controlling the touch screen to display the notification window.

* * * * *